No. 732,975. PATENTED JULY 7, 1903.
C. H. VEEDER.
TACHOMETER.
APPLICATION FILED MAY 6, 1902.
NO MODEL. 3 SHEETS—SHEET 1.
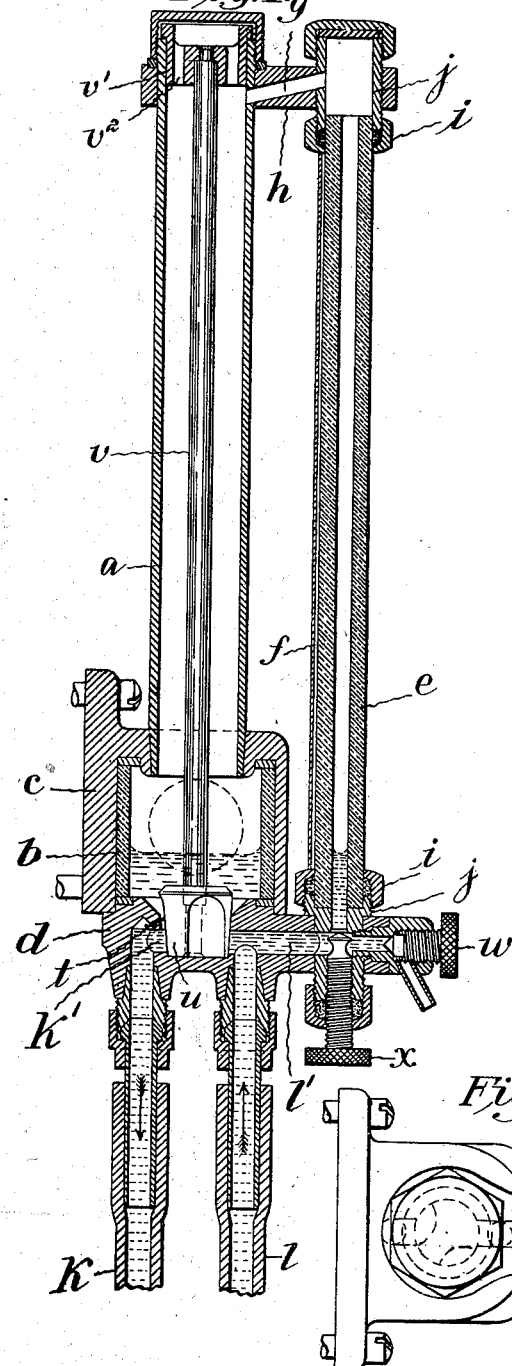
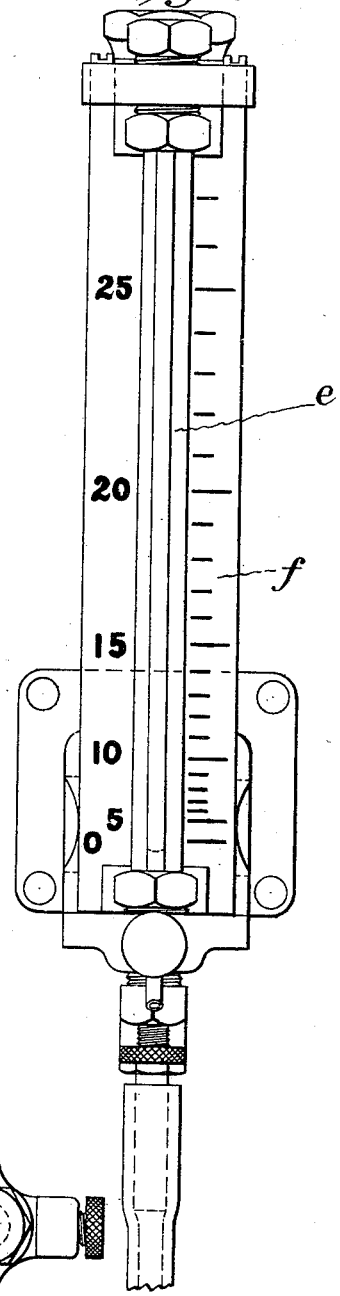
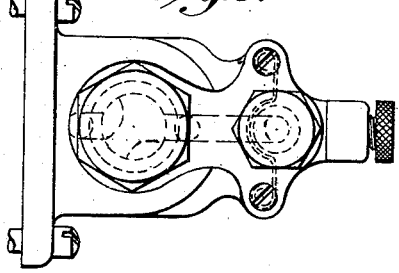
Witnesses
Inventor
Curtis Hussey Veeder
By his Attorneys
Redding, Kiddle & Greeley

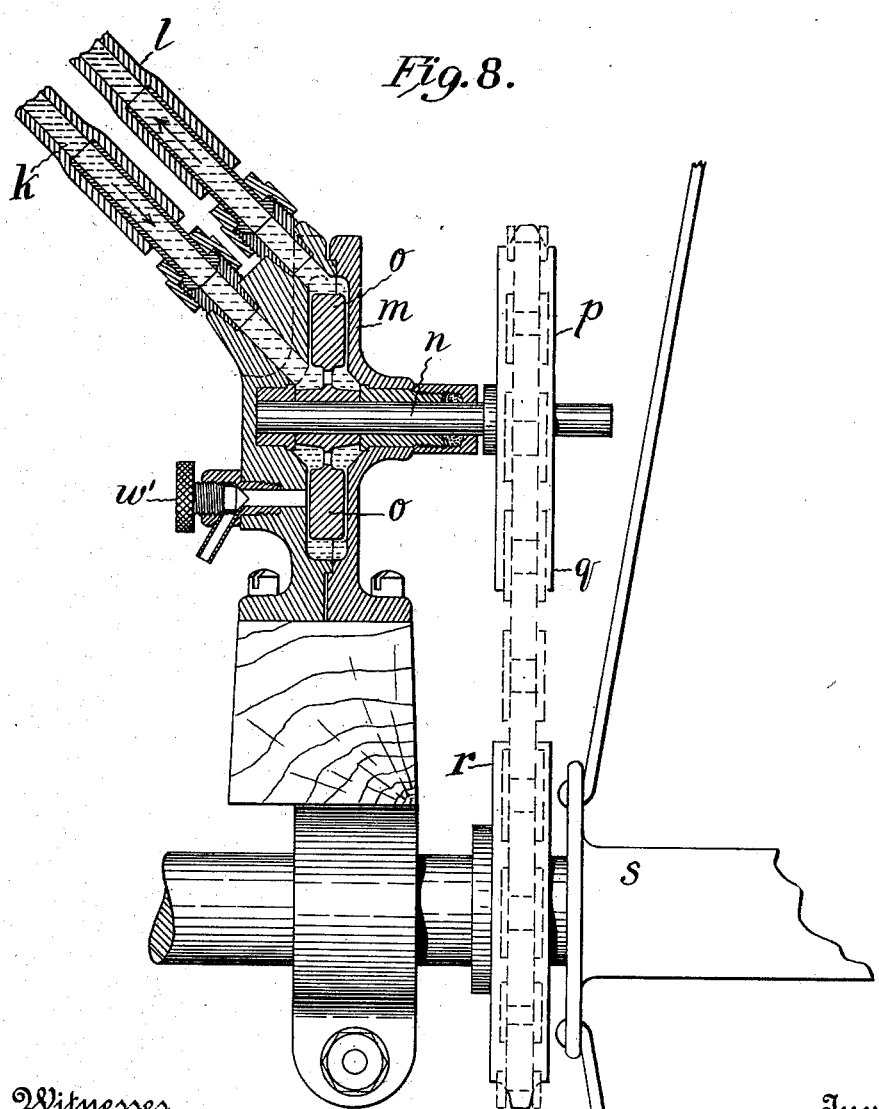

No. 732,975. PATENTED JULY 7, 1903.
C. H. VEEDER.
TACHOMETER.
APPLICATION FILED MAY 6, 1902.
NO MODEL. 3 SHEETS—SHEET 3.
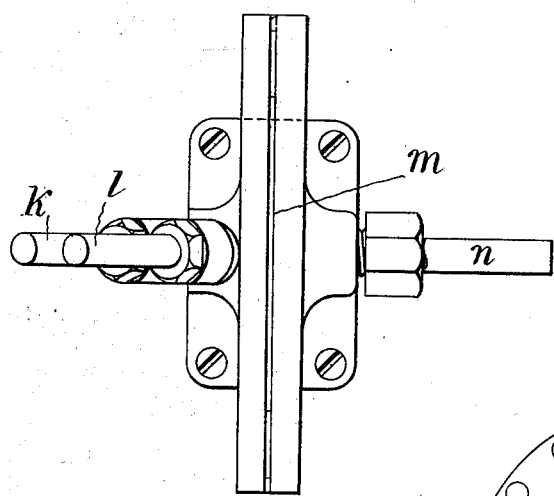
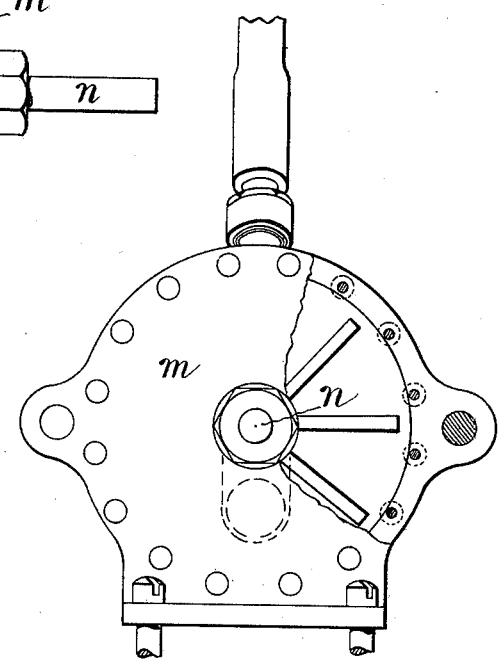
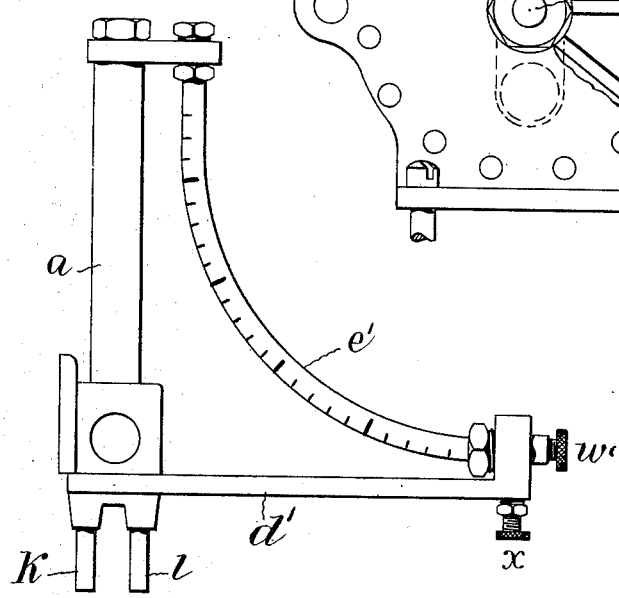
Witnesses
Inventor
Curtis Hussey Veeder
By his Attorneys
Redding, Kiddle & Greeley No. 732,975. Patented July 7, 1903.

UNITED STATES PATENT OFFICE.

CURTIS HUSSEY VEEDER, OF HARTFORD, CONNECTICUT.

TACHOMETER.

SPECIFICATION forming part of Letters Patent No. 732,975, dated July 7, 1903.

Application filed May 6, 1902. Serial No. 106,130. (No model.)

*To all whom it may concern:*

Be it known that I, CURTIS HUSSEY VEEDER, a citizen of the United States, residing at Hartford, in the county of Hartford, State of Connecticut, have invented certain new and useful Improvements in Tachometers, of which the following is a specification, reference being had to the accompanying drawings, forming a part hereof.

This invention relates to the general class of devices or instruments for determining or indicating the speed of machines of various classes.

The object of the invention is to produce an improved device or instrument of this character which shall be accurate, sensitive, and reliable and shall not be likely to get out of order in use.

The improved device has been designed with especial reference to its use for indicating the speed of automobiles and other vehicles; but, as will be evident, it is no less capable of use in indicating the speeds of various other machines whether they are themselves movable, as locomotives, or are stationary, as electric generators, &c.

The action of the device depends upon the difference in the level of two columns of liquid, which is established or effected by a motor interposed between the two columns of liquid and operated by the machine or moving part thereof, the speed of which is to be determined or indicated.

The device or instrument therefore comprises in its simplest form a reservoir to contain the liquid, a second vessel or tube in which the height of the column of liquid can be determined, and a pump interposed between the two vessels and operated by a moving part of the machine, one of the two vessels being connected with the discharge of the pump, while the other is connected with the suction.

The invention may be embodied in many different forms, one of which for purposes of illustration and explanation will be more particularly described hereinafter, and various other features may be added for convenience in the use of the device, as will also be explained hereinafter.

In the accompanying drawings, in which one embodiment of the invention is illustrated, Figure 1 is a view, partly in vertical central section and partly in elevation, of the two tubes or vessels to contain the liquid, with some of their associated parts. Fig. 2 is a view in front elevation of the parts shown in Fig. 1. Fig. 3 is a top view thereof. Figs. 4, 5, 6, and 7 are detail views in section, illustrating different positions of a valve which may be used in connection with the device. Fig. 8 is a view in vertical central section of the motor, the pump being represented as driven from the wheel of a vehicle, which is represented in part, together with the driving connections. Figs. 9 and 10 are respectively a top view and a front elevation of the pump shown in Fig. 8, the driving connections being omitted. Fig. 11 is a view in side elevation, representing a slightly-different arrangement of the two tubes or vessels.

In the embodiment of the invention represented in the drawings the reservoir to contain the colored fluid to be used is represented as a tube of a convenient length, the upper portion $a$ of which may for convenience be of metal, while the lower portion $b$ may be of glass to permit the level of the liquid therein to be observed, the two parts being fitted to and held together by a frame or bracket $c$ of suitable construction. In convenient proximity to the reservoir and, it may be, mounted upon the same base $d$ is the indicator-tube $e$, which is preferably of glass and provided with a suitable scale $f$ behind it in order that the height of the column of liquid therein may be easily noted, although it will be obvious that any desired means may be employed to show the height of the indicating column of liquid. The two tubes are connected at the top by a passage $g$, which may be conveniently formed in a bracket $h$, which unites the two tubes at the upper end, the connecting-passage $g$ being formed for the purpose of equalizing the pressure on the two columns of liquid. In order to facilitate the replacing of the tube $e$ in case of breakage, suitable packing-rings $i$ may be provided at the ends thereof, such rings being threaded upon short tubes $j$, which are suitably secured in the base $d$ and top $h$, respectively. The reservoir and indicating-tube may be located with reference to the pump as convenience in the use of the device may make desirable. They may be connected directly to it, or they may be placed at a distance therefrom and connected therewith by suitable tubes, as indicated in Figs. 1 and 8, the pump being placed in convenient proximity to the operating part, while the reservoir and indicating-tube are placed in a position where the device may be conveniently observed. The pump is of such a character as to tend to change the level of the column of liquid in the indicating-tube with reference to the level of the column of liquid in the reservoir to a greater or less extent, according to the velocity of the pump, but is not of such a character as to transfer the liquid positively from one vessel to the other. It will be obvious that the pump may be constructed in various ways to accomplish this purpose; but it is preferred to use a centrifugal pump, as indicated particularly in Fig. 8 of the drawings, and to connect one vessel, as the reservoir, with the suction of the pump, as by a pipe $k$, and to connect the other vessel, as the indicating-tube, with the periphery of the pump, as by a pipe $l$. The particular pump shown in Figs. 8, 9, and 10 comprises a suitable shell or casing $m$, having suitable bearings for a shaft $n$, which is armed within the shell or casing with blades or paddles $o$, which have a somewhat free fit within the shell or casing. The shaft may be connected mechanically with the driving part by any suitable means, Fig. 8 showing a sprocket-wheel $p$ on the shaft connected by a chain $q$ with a sprocket-wheel $r$ on the hub of a wheel, which is indicated in part at $s$.

The several parts thus far referred to constitute a device which is operative for the purpose of indicating the speed of the wheel $s$; but for convenience in manipulation of the device other features of construction are added, these features being concerned mainly with the maintenance of a proper volume of liquid within the device, the elimination of air-bubbles from the liquid, and the adjustment of the device, and will now be described.

Thus far reference has been made to the tubes $k$ and $l$ as if they were directly and separately connected with the reservoir and the indicating-tube, respectively; but in the embodiment of the invention represented in Fig. 1 of the drawings they are shown as connected to channels $k'$ and $l'$ in the base $d$, these channels being in communication with a valve-seat $t$, in which is seated a valve-plug $u$, formed with channels $u'$ and $u^2$, as clearly shown in Figs. 4, 5, 6, and 7. The valve-plug $u$ is carried by a rod or stem $v$, which is provided at its upper end with a suitable thumb-nut $v'$, by which the valve-plug may be turned, such thumb-nut also being provided with channels $v^2$, through which the necessary amount of liquid may be introduced into the reservoir. At the time of filling the valve-plug is in the position shown in Fig. 4, in which both channels $k'$ and $l'$ are shut off, so that the liquid may stand in the reservoir until the air-bubbles have separated therefrom. When the valve-plug is turned to the position represented in Fig. 5, the liquid goes down through the tube $k$ into the pump and up through the tube $l$ into the indicator-tube $e$, the tube $l$ being, as clearly shown in Fig 1, always in communication with the tube $e$. As the stream of liquid which flows from the reservoir is uninterrupted and has no air-bubbles entrained, it will drive the air in the tubes before it and completely fill all parts of the device, if care is taken that the connecting-tubes have a gradual rise, so that no pockets shall be formed therein. Should it be the case, however, that the connecting-tubes are so placed as to form pockets, the liquid should be circulated through the system of tubes until the air-bubbles are entirely removed. For this purpose the valve-plug is turned to the position shown in Fig 6, in which the liquid rising in tube $l$ can descend through tube $k$, the entrained air separating from the liquid as it passes through the reservoir. Finally, if it is desired at any time to test the condition of the liquid in the tubes when the device is in operation the valve-plug is turned to the position shown in Fig. 7, in which it cuts off communication from the reservoir to the tube $k$ and opens communication between the indicator-tube and the reservoir, so that the liquid in the indicator-tube and reservoir can settle to the same level which it would assume if the pump were stationary.

Any suitable means may be provided for controlling the volume of liquid in the device. In the construction represented in the drawings the addition of liquid is effected in the manner already described—that is, by introducing it into the reservoir through the perforated thumb-nut $v'$—while any desired amount can be withdrawn by means of the cock $w$ (shown in Fig. 1) or the cock $w'$, (shown in Fig. 8,) the latter being used chiefly for the purpose of withdrawing the liquid entirely from the device when it is desired to make changes of any kind.

To regulate the sensitiveness of the instrument and to check any tendency of the liquid to dance in the indicator-tube, as may be the case when the instrument is used on an automobile driven at high speed, the screw valve-plug $x$ is provided in order that the freedom of communication between the pump and the indicator-tube may be increased or diminished as circumstances may require.

Since the height of the column of liquid in the indicator-tube varies with the square of the speed of revolution of the centrifugal pump, and therefore with the speed of the vehicle or driven part, it is obvious that the graduations on the scale used with a straight tube must vary from the bottom to the top, as clearly shown in Fig. 2; but it is obvious that if it is desired that the graduations on the scale shall be uniform the indicator-tube may be bent on a parabolic curve, as shown at $e'$ in Fig. 11, the base $d$ being suitably extended, as represented in the same figure, while the connections to the reservoir are made as already described.

The operation of the device or instrument will be readily understood from the foregoing. Such a volume of liquid is introduced that the column of liquid in the indicator-tube $e$ shall stand at zero when the pump or motor is at rest. As the vehicle or driven part is speeded up the column of liquid in the indicator-pipe will be caused to change its level with reference to the liquid in the reservoir, so that if the scale is made to read up, as shown in Fig. 2, the column of liquid in the indicator-tube will rise, the amount of rise varying with the square of the speed of revolution of the pump. Of course the pump does not act positively to transfer the liquid from the reservoir to the indicator-tubes; but the blades of the pump will slip more or less in the liquid, so that when the difference in level of the two columns for a given speed has been attained no further movement of the liquid in the indicator-tube will take place, but the top of the column will remain at substantially the same height until a change in speed occurs.

It will be evident that when the reservoir and indicator-tube are applied directly to the shell of the pump or motor, so that there is no opportunity for the entraining of air, the valve $u$ may be dispensed with altogether, such valve being provided mainly on account of the possible entraining of air, all of which entrained air must be separated from the liquid before the operation of the instrument becomes uniform and reliable. Various other changes in the construction and arrangement of the device will readily suggest themselves in view of the foregoing as conditions of operation may require, and it is therefore to be understood that the invention is not to be limited to the precise construction and arrangement shown and described herein.

I claim as my invention—

1. A speed-indicator comprising a liquid-pump, an indicator-tube connected to one side of said pump, a reservoir connected to the other side of said pump, and an adjusting-valve interposed in the connection between said pump and said tube to interpose resistance between the pump and the tube and check vibration of the liquid in the tube, substantially as described.

2. A speed-indicator comprising a liquid-pump, an indicator-tube connected to one side of said pump, a reservoir connected to the other side of said pump, a connection between said tube and reservoir above the surface of the liquid to equalize the pressure thereon, and means to interpose resistance between the motor and the tube to check vibration of the liquid in the tube, substantially as described.

3. A speed-indicator comprising a liquid-reservoir, an indicator-tube, a liquid-pump interposed between the reservoir and the indicator-tube, and a valve-plug interposed in the connections between the reservoir and the pump whereby communication may be established or cut off between the reservoir and either of the connections to the pump, substantially as described.

4. A speed-indicator comprising a liquid-reservoir, an indicator-tube, a pump interposed between the reservoir and the indicator-tube, one of said parts being connected to the suction of the pump and the other to the discharge thereof, and a valve-plug interposed between the reservoir and the pump whereby communication between the reservoir and either the suction or the discharge of the pump may be established or cut off, substantially as described.

5. A speed-indicator comprising a base provided with passages, an indicator-tube and a reservoir mounted upon said base and communicating with said passages, means to connect said tube and reservoir at the top, a liquid-pump, pipes connecting the opposite sides of said pump respectively with said tube and reservoir through said passages in the base, and a valve-plug interposed between the passages in the reservoir to change the connections between the reservoir and the pump, substantially as described.

6. A speed-indicator comprising a liquid-motor, an indicator-tube bent substantially on a parabolic curve connected to one side of said pump, a reservoir connected to the other side of said pump, and a connection between said tube and reservoir above the surface of the liquid therein, substantially as described.

7. A speed-indicator comprising a liquid-motor, an indicator-tube bent substantially on a parabolic curve connected to one side of said pump, a scale for said indicator-tube having uniform graduations, a reservoir connected to the other side of said pump, and a connection between said tube and reservoir above the surface of the liquid therein, substantially as described.

This specification signed and witnessed this 30th day of April, 1902.

CURTIS HUSSEY VEEDER.

In presence of—
D. J. POST,
K. F. CLEW.